(12) United States Patent
Salovaara

(10) Patent No.: US 8,951,003 B2
(45) Date of Patent: Feb. 10, 2015

(54) STACKING DEVICE

(71) Applicant: Raute Oyj, Nastola (FI)

(72) Inventor: Reijo Salovaara, Nastola (FI)

(73) Assignee: Raute Oyj, Nastola (FI)

( * ) Notice: Subject to any disclaimer, the term of this patent is extended or adjusted under 35 U.S.C. 154(b) by 74 days.

(21) Appl. No.: 13/712,061

(22) Filed: Dec. 12, 2012

(65) Prior Publication Data

US 2013/0164111 A1 Jun. 27, 2013

(30) Foreign Application Priority Data

Dec. 21, 2011 (FI) .................................... 20116297

(51) Int. Cl.
  *B65G 57/04* (2006.01)
  *B65G 57/03* (2006.01)
  (Continued)

(52) U.S. Cl.
  CPC ............... *B65G 57/03* (2013.01); *B65H 29/34* (2013.01); *B65H 31/10* (2013.01); *B65H 2406/342* (2013.01); *B65H 2406/343* (2013.01); *B65H 2406/365* (2013.01); *B65H 2701/1938* (2013.01)
  USPC .................. 414/793.3; 414/790.8; 414/792.7; 414/793; 414/793.5

(58) Field of Classification Search
  CPC ........ B65G 57/00; B65G 57/06; B65G 57/11; B65G 57/14; B65G 57/04; B65G 57/02; B65G 61/00; B65H 9/10; B65H 9/101; B65H 9/105; B65H 9/108; B65H 9/12; B65H 9/14; B65H 29/24; B65H 29/245; B65H 29/26; B65H 29/34; B65H 43/00; B65H 43/08

USPC .......... 414/793.9, 790.8, 790.9, 791.1, 792.7, 414/793, 793.4, 793.5, 793.8, 796.9, 797, 414/798; 271/218
See application file for complete search history.

(56) References Cited

U.S. PATENT DOCUMENTS 3,346,128 A * 10/1967 Hullhorst .................... 414/789.1
3,567,047 A * 3/1971 Clausen et al. ............... 271/176
3,583,562 A * 6/1971 Yock et al. .................... 209/586

(Continued)

FOREIGN PATENT DOCUMENTS

| | | |
|---|---|---|
| DE | 102005002507 | 8/2005 |
| FI | 121873 | 5/2011 |
| GB | 446886 | 5/1936 |

OTHER PUBLICATIONS

Finnish Search Report dated Oct. 9, 2012, corresponding to the Foreign Priority Application No. 20116297.

*Primary Examiner* — Saul Rodriguez
*Assistant Examiner* — Lynn Schwenning
(74) *Attorney, Agent, or Firm* — Young & Thompson

(57) ABSTRACT

A device for stacking veneer sheets (1, 2) while substantially horizontal, the device including a supporting element, that escapes in the advancement direction at a release area from beneath the veneer (2) to be stacked, the supporting element being moved by a conveyor (7), and a controlled element for stopping the veneer to be stacked in a corrected position at a release point. An element for stopping the veneer to be stacked is a gripper (10) that grips the trailing edge of the veneer (2) from below and moves up and down, in the advancement direction of the veneer, and transversely to it, the gripper having a gripping point to the veneer at the trailing edge in the veneer's advancement direction, extended at a distance in the advancement direction from the gripper's transverse travel path.

20 Claims, 6 Drawing Sheets

Figure 1:
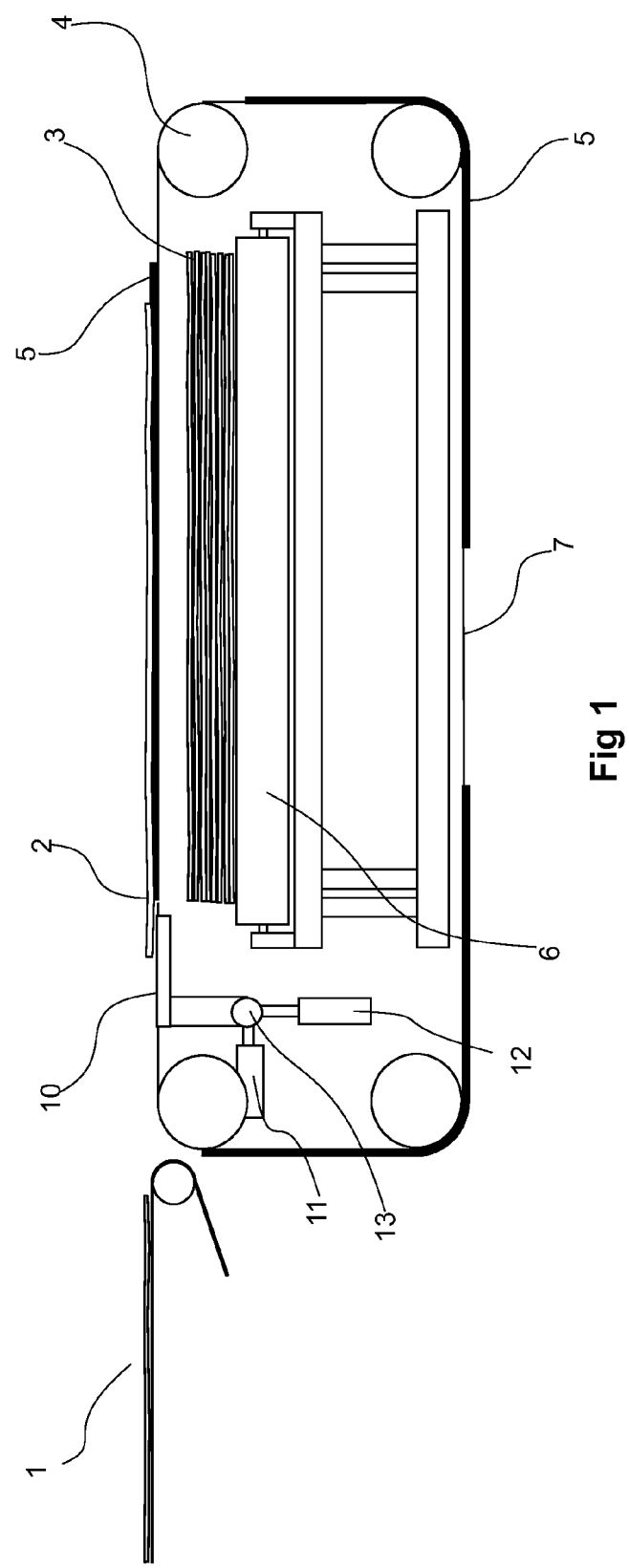

(51) Int. Cl.
*B65H 29/34* (2006.01)
*B65H 31/10* (2006.01)

(56) References Cited

U.S. PATENT DOCUMENTS

| | | | |
|---|---|---|---|
| 3,807,553 A | 4/1974 | Billett et al. | |
| 3,845,950 A * | 11/1974 | Kuzniak | 271/194 |
| 3,894,638 A * | 7/1975 | Hovekamp | 414/793.5 |
| 4,055,247 A * | 10/1977 | Benedick et al. | 206/3 |
| 4,642,013 A * | 2/1987 | Mundus et al. | 414/790.7 |
| 5,098,079 A * | 3/1992 | Sanborn, III | 271/176 |
| 5,123,807 A * | 6/1992 | Nakaoda et al. | 414/789.6 |
| 5,460,361 A * | 10/1995 | Mokler | 271/183 |
| 5,569,016 A * | 10/1996 | Mokler | 414/793.1 |
| 6,213,282 B1 | 4/2001 | Mokler et al. | |
| 6,672,585 B2 * | 1/2004 | Nishida et al. | 271/211 |
| 6,860,481 B2 * | 3/2005 | Chiasson et al. | 271/189 |
| 2010/0176549 A1* | 7/2010 | Roth | 271/308 |
| 2011/0057384 A1 | 3/2011 | Perttila | |

* cited by examiner

STACKING DEVICE

The object of the present invention is a stacking device for stacking plywood veneer.

With the device veneer sheets cut-to-size can be stacked as a compiled pile in which the veneer sheets are accurately positioned.

Such positioning stacking devices are used, for example, for compiling piles formed of glued sheets to be pressed as plywood. A stacking device is preceded by a monitoring device which records the position and orientation of a sheet heading to the stacking device at a conveyor carrying the sheet. The position and orientation information recorded by the monitoring device is used to control the members which position the sheet to the pile.

It is known to use a horizontal conveyor having support and release sections alternating in the transportation direction to move and release a sheet to be stacked at a stacking point. The transportation section is sized substantially in accordance with the dimensions of the sheet, and supports the sheet from below. The support section is followed, before the next support section, by an intermediate space through which the sheet can be dropped from a support section escaping below by blocking the advancement of the sheet. Such a stacking device is described in, for example, U.S. Pat. No. 3,807,553. In the device described in this publication, the advancement of the sheet to be dropped from the support section is blocked with stoppers lowered in front of the leading edge of the sheet. The stoppers set the sheet's drop point in its direction of advancement, and they can also be used to correct the advancement orientation prior to the dropping. The device does not have the possibility for lateral positioning with respect to the advancement direction. Additionally, while piling up against a stopper, the piling accuracy decreases substantially due to the properties of veneer. For example, breaking, yielding/bouncing, and folding of the veneer reduce accuracy.

The object of the present invention is to provide a stacking device for veneer sheets, with which device veneer sheets can be stacked in a positioned manner. Devices recording the position and orientation of the veneer by monitoring the veneer at the conveyor preceding stacking can be used for defining the positioning. Information for the controllers of the stacking device's actuators can be gathered from the registering devices. Positioning enables a substantially better piling precision than what can be achieved when piling against stoppers.

The basic structure of the device is as known, i.e., it comprises a conveyor escaping from underneath the veneer at a release point and means for stopping the veneer to be stacked at the release point for correcting the orientation. According to the invention, the means for stopping the veneer are grippers gripping the veneer's trailing edge from below and being movable in the up-down directions, the veneer's advancement direction, and the direction transverse to this, the grippers' gripping point to the veneer being at the trailing edge in the veneers advancement direction, extended at a distance from the grippers' transverse travel path.

Figure 2:
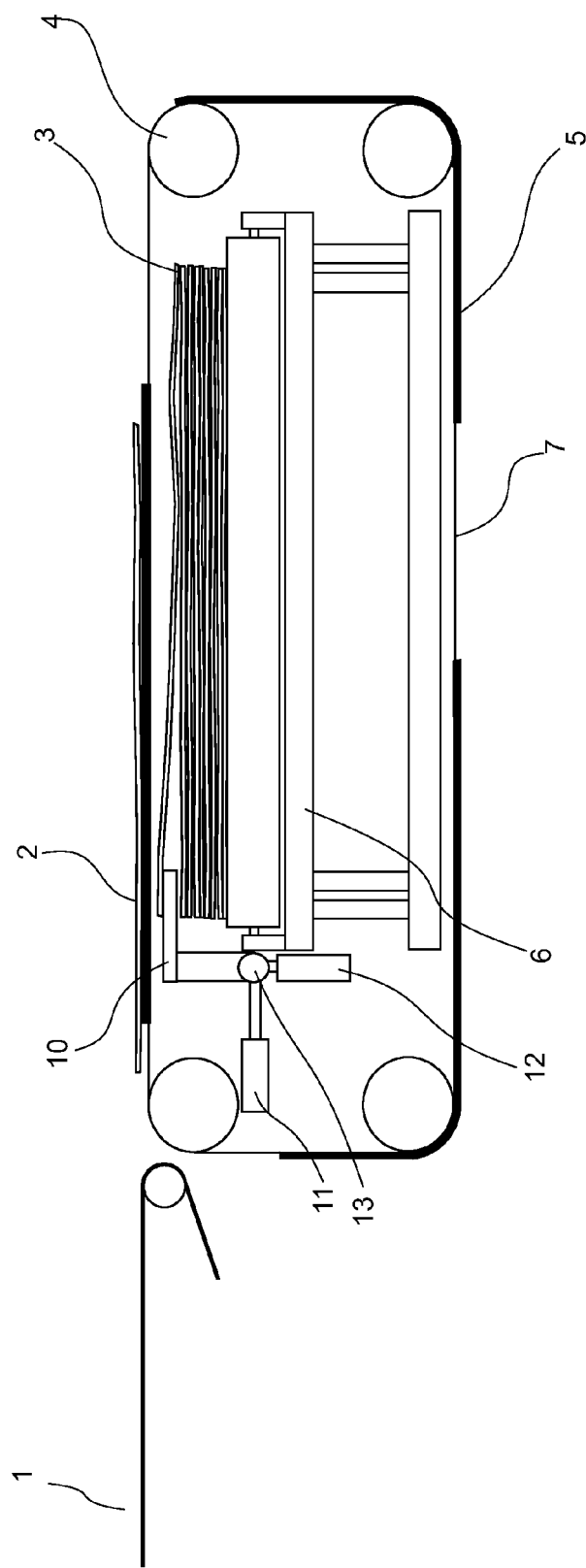
Figure 3:
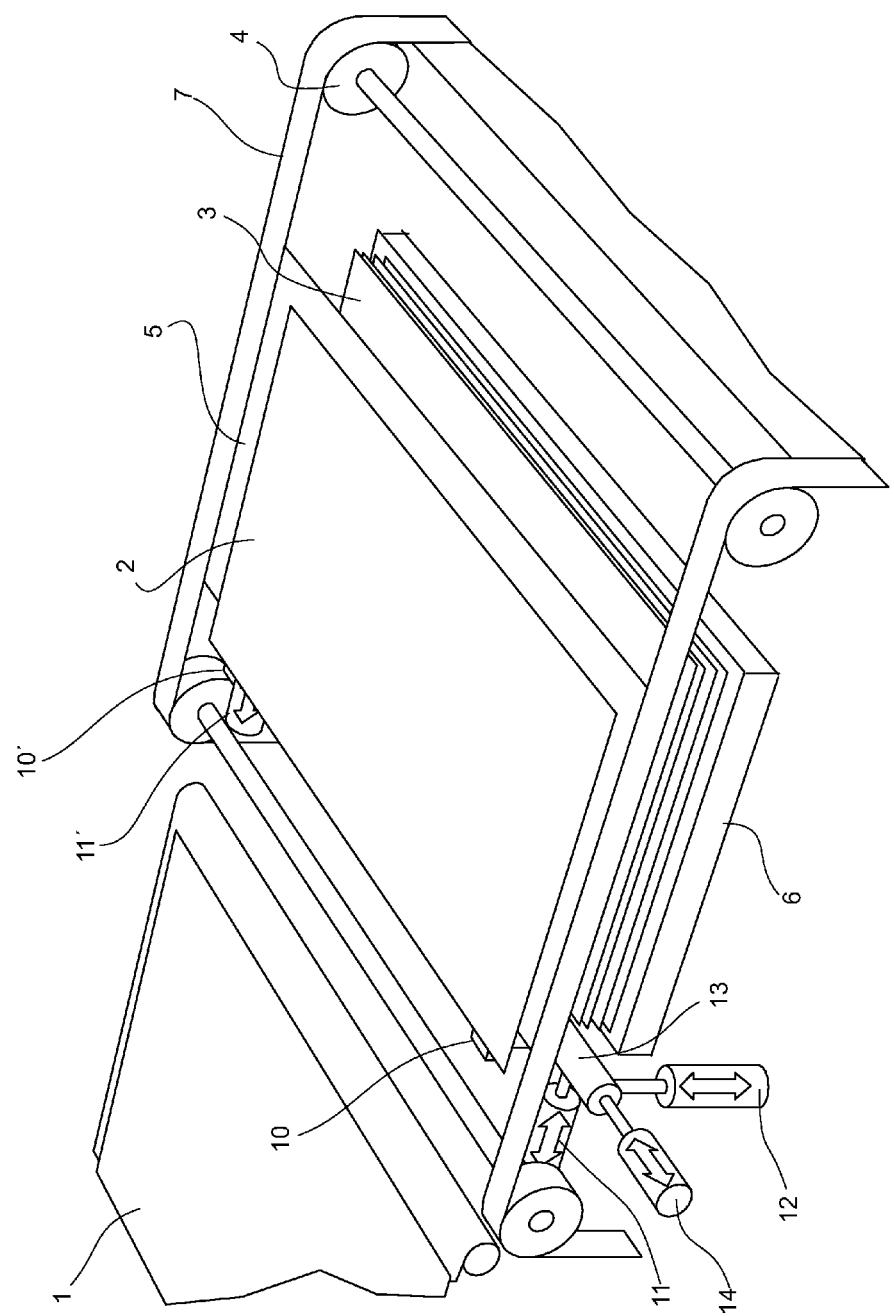
Figure 4:
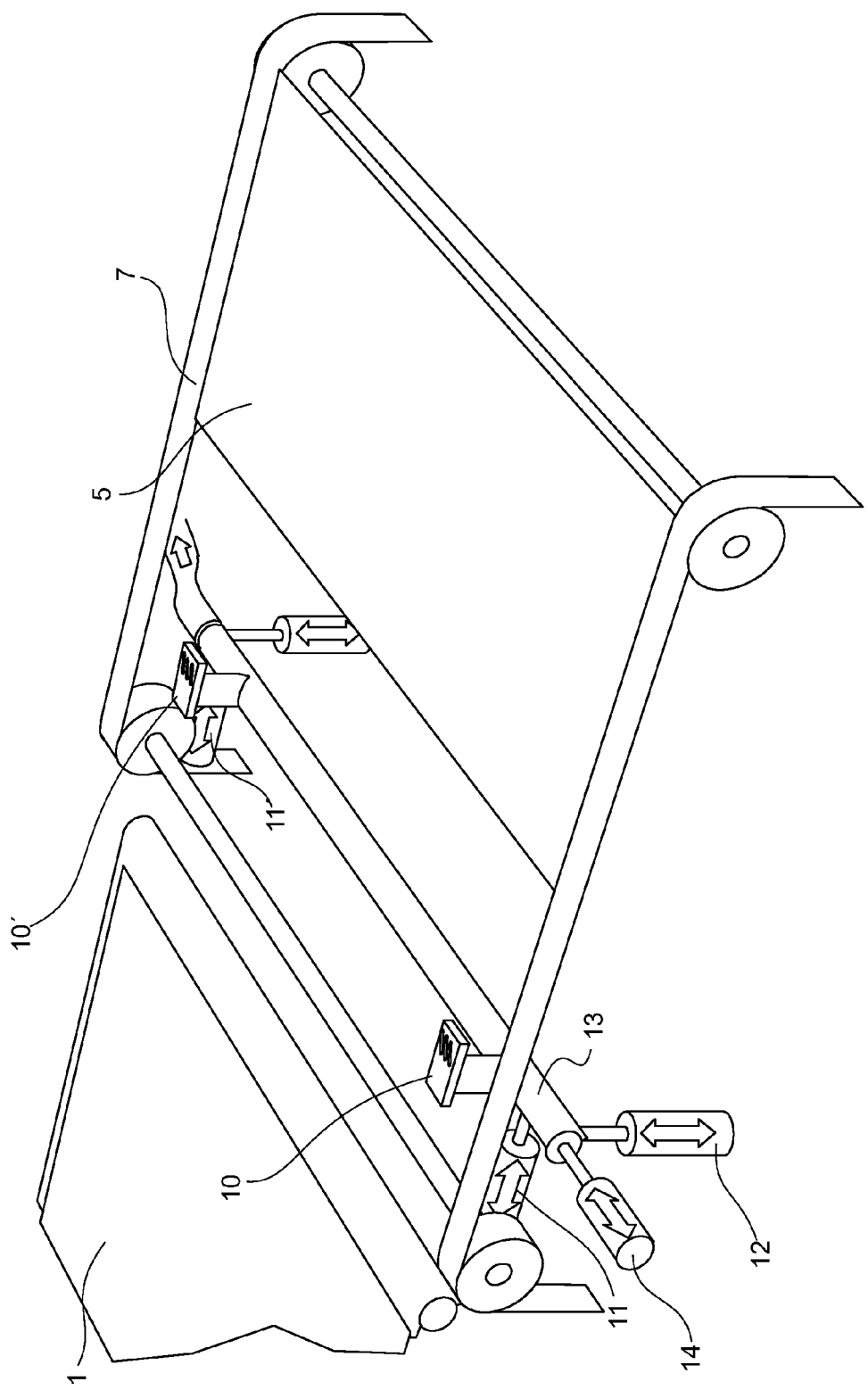
Figure 5:
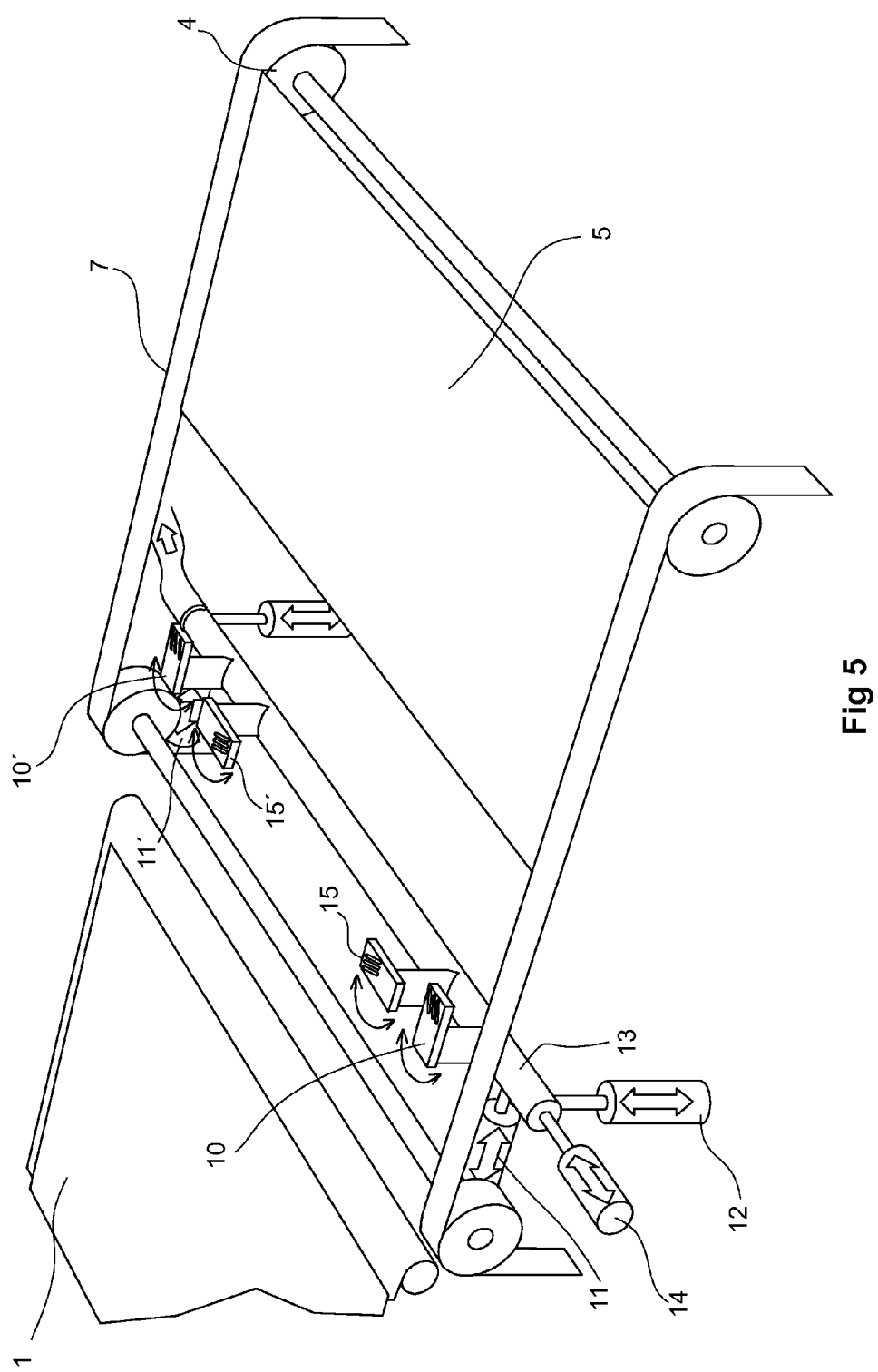
Figure 6B:
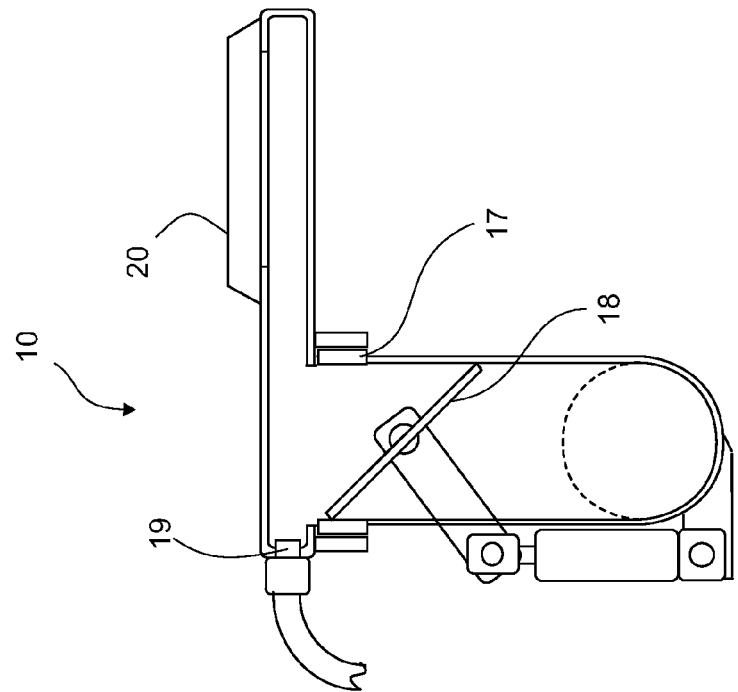
Figure 6A:
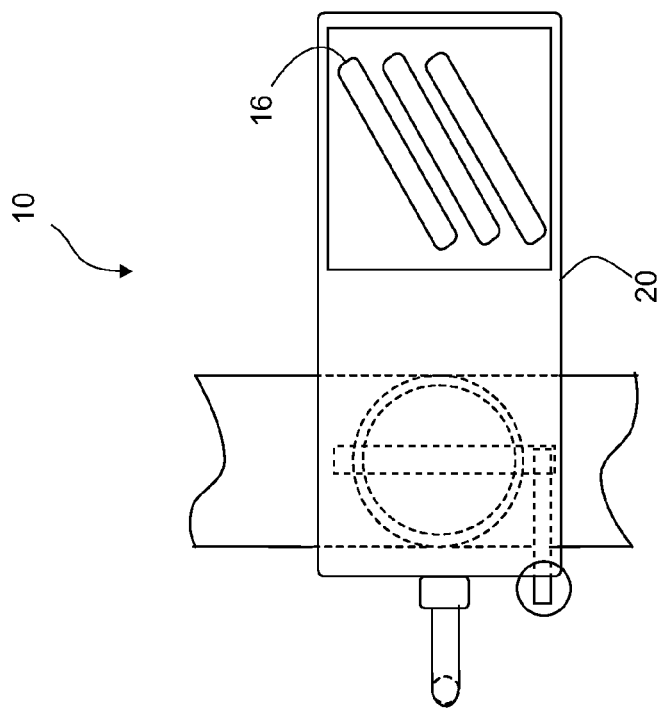

The invention is described in more detail with reference to the attached drawing, in which FIG. 1 illustrates a stacking device according to the invention as a diagrammatic side view at the initial stage of releasing a veneer sheet, FIG. 2 illustrates a stacking device at the end of the stacking stage, respectively, FIG. 3 shows the situation of FIG. 1 as an illustrative drawing, and FIG. 4 illustrates the basic components of the device, FIG. 5 illustrates a device according to an embodiment of the invention, FIGS. 6a and 6b illustrate grippers according to an embodiment of the invention.

FIG. 1 shows a veneer sheet stacking device for stacking veneer sheets 1, 2, brought by a conveyor, as a pile 3 on the platform 6 which is downwardly descending in accordance with the growth of the pile. As a basic part of the device there is a conveyor belt 7 which circulates around pulleys 4 and is equipped with supporting members 5 placed successively at a distance from each other. The supporting members have a size substantially corresponding to the size of the largest veneer sheet to be stacked and they support a veneer sheet fed for piling as it passes to the stacking area. In the stacking area, the movement of a veneer sheet 2 is stopped and the supporting member 5 slides beneath the sheet in the conveying direction, so that the sheet, while still being gripped, falls between the supporting members on to the pile 3.

The device has grippers 10 and 10' for stopping the veneer sheet 2 on the conveyor 7. In the beginning of the device's operation cycle the grippers are below the level of the supporting members 5, and are in stand-by to be lifted in to contact with the veneer sheet 2 supported by supporting member 5 of the conveyor 7. To enable this contact, the veneer sheet is guided to the supporting member so that its trailing edge extends, to some extent, outside the supporting member. The device has a vertical double acting piston-cylinder actuator 12, or the like, at both sides for lifting the grippers. The grippers 10 and 10' are suction actuated and connected to a corresponding suction line 13. The suction is timed using an actuator within the suction line 13.

The grippers 10 and 10' serve in the device firstly to prevent the advancement of the veneer 2 as the conveyor 7 continues its advancing movement while the veneer falls from the supporting member escaping below, the veneer being still held by the grippers 10 and 10' and guided by them to the platform 6 or on top of the uppermost veneer sheet of the pile 3 formed on the platform. For enabling guidance during the stacking of the veneer sheet 2, the gripper 10' and 10' should be enabled to a back and forth movement in the advancement direction of the veneer, which back and forth movement should be synchronized with the movement of the conveyor's supporting members 5. (The movement of the conveyor bringing veneer to the device should, in turn, be synchronized with the movement of the conveyor 7.) This reciprocating movement in the advancement direction of the sheet can be produced with an actuator 11, which may be of a similar structure and operation as actuator 12.

In FIG. 5 a device is illustrated in which grippers 10 and 10' are implemented as gripper pairs 10, 15 and 10', 15'. As seen in FIG. 6a, grippers may be equipped with suction apertures or slots 16, with which the suction is directed to the lower surface of a veneer sheet 2. As illustrated in FIG. 6b, grippers may be equipped with a riser 20. Additionally, the grippers can be provided with a flap 18 for closing the suction. Grippers may also have a compressed air supply 19. Further, a gripper may be supported by bearing 17 enabling rotation.

With these machine components a veneer 2 advancing on the conveyor 7 can be lowered onto the platform 6 and on the pile 3, respectively, using two modes of operation.

The grippers 10, 10' may be positioned in the advancement direction of the veneer below the conveyor 7 so that they lower the veneer sheet, which they have gripped when raised, positioned in the sheets' advancement direction as illustrated in FIG. 2, from which position the grippers 10, 10' are retracted when lowered away from beneath the edge of the stacked veneer, and further positioned again to the positioning location between the pile 3 and the conveyor to await the next veneer to be stacked. Another mode of operation is that the grippers 10 and 10' are driven a distance opposite to the sheet's advancement direction to a position where the grippers are raised to grip the sheet and to follow the sheet so as to stop it at the stacking point in the advancement direction.

The veneer sheet coming to the stacking area can also be laterally displaced with respect to the advancement direction and/or twisted with respect to the advancement direction, which position has to be corrected in order to achieve an appropriate pile. For this purpose, the grippers 10, 10' are controllably movable also in a direction transverse to the advancement direction of the sheet. With a uniform lateral movement of the grippers 10, 10', the sheet's lateral displacement relative to the direction advancement is corrected. For the lateral movement of the grippers 10', 10 the device has at one side an actuator 14, which can be of a similar operating principle as actuators 11 and 12.

For fully controlling the device, it has to be equipped with monitoring equipment, with which the position and orientation of the veneer 1 coming in to be stacked can be registered, and with which this information can be forwarded to the equipment controlling the operation of the device's parts. The monitoring equipment is preferably based on machine vision equipment known in the art and commonly known devices processing information produced by it. Control can be implemented using photo detectors or other well known components.

One or both of the grippers 10, 10' may be implemented as a controllably alternating gripper pair 10, 15; 10', 15', in which the other gripper of the pair, for example 15, 15', is used for manipulating a specific veneer or specific veneers. For example, when compiling a pile from glued veneer, the grippers 10, 10' have a tendency to get, to some extent, contaminated with the glue from the trailing edge of the veneer when the grippers are pulled out from beneath the veneer lowered onto a stack. The grippers gripping onto the first (lowest) veneer in the pile should be clean in order to avoid stains on the finished surface of a plywood board. Preferably, the second gripper 15, 15' of the pair is used to stack the first veneer in the pile.

When compiling a veneer pile, the aim is to select the surface veneers so that they have as little cracks and knot holes as possible. The veneer sheets are, however, applied with glue which can extend over the edge of the veneer sheet, which in turn can contaminate the grippers (10, 15, 10', 15').

The contamination of the grippers can also be prevented by closing the suction of the grippers, for example with actuators or with the flap 18 within the suction tube 13, and by blowing compressed air at the lower surface of the veneer sheet as the grippers are pulled out from beneath a veneer sheet lowered onto a pile. The blow lifting the edge of the veneer sheet can advantageously be arranged through a nozzle 19 from the same suction aperture or slot 16, from which suction was previously directed to the lower surface of a veneer sheet. In addition, the grippers can be preferably be constructed so that the area, with which the gripper directs the suction to the lower surface of a veneer sheet 2, i.e. suction aperture or slot 16, is raised in comparison to the other parts of the gripper below the veneer sheet. This can be implemented for example with a riser 20, as illustrated in FIG. 6b, which is easily replaceable as it wears or gets contaminated. This solution also has the advantage that the riser is at no point in contact with the edge of the veneer sheet, and thus does not get contaminated by the glue extending over the edge of the veneer sheet.

In the above description the invention is disclosed using two grippers 10, 10' and two pairs of grippers 10, 15, 10', 15'. It should however be noted that the invention and its features can just as well be achieved by using just one gripper 10. In such a situation, the gripper 10 is preferably located in the middle in the transverse direction to the advancement of the veneer 2. If the invention is implemented using just one gripper, it is preferably equipped with actuators for rotating the gripper in the plane of the veneer, so that the rotation of the veneer 2 can be corrected. It is naturally obvious that if a single gripper 10 is used, it can be implemented as gripper pair 10, 15. Further, it should be understood that there could be more than two grippers or pairs of grippers.

The invention claimed is:

1. A device for stacking veneer sheets while substantially horizontal comprising:
   a supporting member, moved by a conveyor, that is configured to escape in the advancement direction at a release area from beneath the veneer to be stacked, and
   at least one controlled gripper configured to stop the veneer in order to stack the veneer in a corrected position at a release point, wherein
   the at least one controlled gripper is configured to grip the trailing edge of the veneer from below and move up and down, in an advancement direction of the veneer, and a direction transverse to the advancement direction of the veneer, the at least one controlled gripper having a gripping point to the veneer at the trailing edge in the veneer's advancement direction, extended at a distance in the advancement direction from the grippers transverse travel path, and wherein
   the at least one controlled gripper is at least partially configured to extend on top of the stack when stacking a veneer sheet to the stack.

2. A stacking device according to claim 1, wherein the stacking device comprises multiple grippers located at distance from each other in a direction transverse to the advancement direction of the veneer.

3. A stacking device according to claim 1, wherein at least one of said at least one controlled grippers operating in connection with the gripping point is implemented as a controllably alternating gripper pair.

4. A stacking device according to claim 1, wherein the gripping area of at least one controlled gripper operating in connection with the gripping point is raised with respect to other parts of the gripper beneath the veneer sheet.

5. A stacking device according to claim 1, wherein a suction directed to the veneer sheet by the at least one controlled gripper is configured to be closed and compressed air is configured to be directed to the veneer sheet for releasing it from the at least one controlled gripper for pulling out the at least one controlled gripper from beneath the veneer sheet which has been lowered on to a pile.

6. A stacking device according to claim 1, wherein the at least one controlled gripper is configured to grip the veneer in a gripping position preceding a release position, and to move from the gripping position to the release position in the advancement direction substantially at the speed of the conveyor.

7. A stacking device according to claim 1, wherein the at least one controlled gripper is configured to be separately positioned transversely to the advancement direction of the veneer sheet and rotatable about its gripping point in the veneer's plane.

8. A stacking device according to claim 1, wherein the gripper is configured to be controlled by monitoring devices registering the position and orientation prior to the stacking device of the veneer to be stacked.

9. A stacking device according to claim 2, wherein at least one of said at least one controlled grippers operating in connection with the gripping point is implemented as a controllably alternating gripper pair.

10. A stacking device according to claim 2, wherein the gripping area of at least one controlled gripper operating in connection with the gripping point is raised with respect to other parts of the gripper beneath the veneer sheet.

11. A stacking device according to claim 3, wherein the gripping area of at least one controlled gripper operating in connection with the gripping point is raised with respect to other parts of the gripper beneath the veneer sheet.

12. A stacking device according to claim 2, wherein a suction directed to the veneer sheet by the at least one controlled gripper is configured to be closed and compressed air is configured to be directed to the veneer sheet for releasing it from the at least one controlled gripper for pulling out the at least one controlled gripper from beneath the veneer sheet which has been lowered on to a pile.

13. A stacking device according to claim 3, wherein a suction directed to the veneer sheet by the at least one controlled gripper is configured to be closed and compressed air is configured to be directed to the veneer sheet for releasing it from the at least one controlled gripper for pulling out the at least one controlled gripper from beneath the veneer sheet which has been lowered on to a pile.

14. A stacking device according to claim 4, wherein a suction directed to the veneer sheet by the at least one controlled gripper is configured to be closed and compressed air is configured to be directed to the veneer sheet for releasing it from the at least one controlled gripper for pulling out the at least one controlled gripper from beneath the veneer sheet which has been lowered on to a pile.

15. A stacking device according to claim 2, wherein the at least one controlled gripper is configured to grip the veneer in a gripping position preceding a release position, and to move from the gripping position to the release position in the advancement direction substantially at the speed of the conveyor.

16. A stacking device according to claim 3, wherein the at least one controlled gripper is configured to grip the veneer in a gripping position preceding a release position, and to move from the gripping position to the release position in the advancement direction substantially at the speed of the conveyor.

17. A stacking device according to claim 4, wherein the at least one controlled gripper is configured to grip the veneer in a gripping position preceding a release position, and to move from the gripping position to the release position in the advancement direction substantially at the speed of the conveyor.

18. A stacking device according to claim 5, wherein the at least one controlled gripper is configured to grip the veneer in a gripping position preceding a release position, and to move from the gripping position to the release position in the advancement direction substantially at the speed of the conveyor.

19. A stacking device according to claim 2, wherein the at least one controlled gripper is configured to be separately positioned transversely to the advancement direction of the veneer sheet and rotatable about its gripping point in the veneer's plane.

20. A stacking device according to claim 3, wherein the at least one controlled gripper is configured to be separately positioned transversely to the advancement direction of the veneer sheet and rotatable about its gripping point in the veneer's plane.

* * * * *